United States Patent
Turner

(10) Patent No.: US 6,706,984 B1
(45) Date of Patent: Mar. 16, 2004

(54) DEVICE FOR REMOTE ACTIVATION OF CONTROL BOX BUTTONS

(76) Inventor: S. Chase Turner, 810 White Oak Dr., Blue Ridge, VA (US) 24064

( * ) Notice: Subject to any disclaimer, the term of this patent is extended or adjusted under 35 U.S.C. 154(b) by 0 days.

(21) Appl. No.: 10/299,544

(22) Filed: Nov. 20, 2002

(51) Int. Cl.[7] ............................................. H01H 3/00
(52) U.S. Cl. ..................................................... 200/331
(58) Field of Search ............................. 200/17 R, 537, 200/538, 543, 330, 331

(56) References Cited

U.S. PATENT DOCUMENTS

| | | | |
|---|---|---|---|
| 4,954,668 A | * 9/1990 | Sako ........................... | 200/314 |
| 5,023,417 A | * 6/1991 | Magiera ..................... | 200/331 |
| 5,270,505 A | * 12/1993 | Magiera ..................... | 200/331 |
| 5,401,930 A | * 3/1995 | Eastlund ..................... | 200/543 |
| 5,428,196 A | * 6/1995 | Beatty et al. ................ | 200/329 |
| 5,613,405 A | 3/1997 | Kelley et al. ............... | 74/502.4 |
| 5,706,705 A | 1/1998 | Stringer ....................... | 74/502 |
| 5,821,488 A | 10/1998 | Falcon ........................ | 200/52 R |
| 5,956,807 A | 9/1999 | Kuo ............................ | 16/113.1 |
| 6,301,991 B2 | 10/2001 | Ficyk et al. ................. | 74/502 |

* cited by examiner

*Primary Examiner*—Michael A. Friedhofer
(74) *Attorney, Agent, or Firm*—Norman B. Rainer

(57) ABSTRACT

A manually operable device for depressing push button control buttons associated with a distantly located control box having opposed surfaces employs a motion transmitting flexible control cable assembly having a sheath element elongated between a user operated extremity and responsive distal extremity, and a core element slideably disposed within the sheath element. The distal extremity of the sheath element is secured by a receiving head adapted to be adjustably positioned upon an elongated straight bar. Two facing clamping components adjustably engage the bar on opposite sides of the receiving head and are adapted to forcefully interact with the opposed surfaces of the control box.

8 Claims, 2 Drawing Sheets

DEVICE FOR REMOTE ACTIVATION OF CONTROL BOX BUTTONS

BACKGROUND OF THE INVENTION

1. Field of the Invention

The present invention relates to the field of cable actuators for the remote manual activation of a reaction mechanism, and more particularly concerns a cable actuator for quickly and releasibly engaging a control box for the purpose of depressing control buttons associated with said box.

2. Description of the Prior Art

Motion transmitting remote control cable assemblies of the type for transmitting motion in a curved path by means of a flexible motion transmitting core element are frequently used in applications to control the movement of something from a remote location. In the automotive industry in particular, transmissions, ventilation systems, fuel systems, hood releases and the like are frequently actuated by a motion transmitting remote control assembly from a remote actuating location. Such motion transmitting remote control cable assemblies include a protective sheath-like conduit which slidably supports an internal moving core element which is generally a relatively stiff multifilament wire of twisted or braided construction. The conduit is often of the composite type having an inner tubular liner defining the internal boundaries of a core passage, at least one metallic supportive lay wire wrapped helically about the liner, and an outer cover disposed about the lay wire. The core element is adapted to undergo reciprocal axial sliding movement within the sheath conduit.

The cable assembly extends between a user-operated extremity, and a distal or responsive extremity that interacts with a mechanical component sought to be moved by virtue of axial motion of the core element. In most applications, both extremities of the cable assembly are secured at spaced apart locations of a system of mechanical componentry. Examples of such applications are described in U.S. Pat. Nos. 5,613,405; 5,706,705; 5,821,488; 5,956,807; and 6,301,991. In general, in such fixedly installed applications, the distal extremity of the cable assembly is attached by way of specialized fittings to the specific mechanical component that is to be moved by the action of the core element. Special features are often needed to facilitate the reciprocal, back and forth movement of the core element within the sheath conduit.

In industrial operations wherein delivery trucks must back into a receiving dock platform to facilitate the unloading of the truck's cargo, it is often necessary that an adjustable ramp mechanism be employed so as to provide a continuous transition between the rear end of the truck's cargo space and the ramp. Such adjustable ramp mechanisms are generally referred to as "dock levelers". A prominent dock leveler is manufactured by the Kelley Company of Milwaukee, Wis.

The raising and lowering of the ramp of a powered dock leveler is achieved by a motor-operated pneumatic or hydraulic mechanism. Control push buttons for operation of said mechanism are generally located adjacent the receiving platform in a control box attached to an outside or inside wall. Outside push buttons may be housed within a sturdy control box which provides protection against impact and weathering factors. The control box is generally bounded by two opposed, substantially flat surfaces, and houses one or more actuating push buttons for achieving start, stop and reverse functions relative to the up and down motion of the ramp.

Because the tailgate of the truck is often obscured from the view of an operator standing at the control box on the receiving platform, two persons are often required to achieve precise positioning of the ramp. One person stands adjacent the tailgate to observe the proximity of the ramp, and delivers oral instructions to the second person on the receiving platform who is operating the ramp. Such operation is time-consuming and labor intensive, and is even more time-consuming when a second person is not available.

It is accordingly an object of the present invention to provide a device for depressing actuation buttons on a control box from a distance remote from said box.

It is another object of this invention to provide a device as in the foregoing object which can be manually operated at varied distances from said control box.

It is a further object of the present invention to provide a device of the aforesaid nature which can quickly and easily interact with control boxes of varied size and shape.

These objects and other objects and advantages of the invention will be apparent from the following description.

SUMMARY OF THE INVENTION

The above and other beneficial objects and advantages are accomplished in accordance with the present invention by a remote control device for depressing actuating buttons on a control box, comprising:

a) an elongated motion transmitting flexible control cable assembly comprised of a sheath element elongated between a user operated extremity and responsive distal extremity, and a core element disposed within said sheath element for reciprocal sliding movement therein, and having portions that extend beyond the user and distal extremities of said sheath element, b) a clamping mechanism comprised of an elongated straight rigid bar having two facing clamping components spaced apart by an adjustable distance, c) a receiving head slidably positioned on said bar between said clamping components, said receiving head securing in an axially slidable manner that portion of said core element that extends beyond the distal extremity of said sheath element, and d) a contacting tip associated with said core element extending from said receiving head, and adapted to press against a selected actuating button of said control box.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
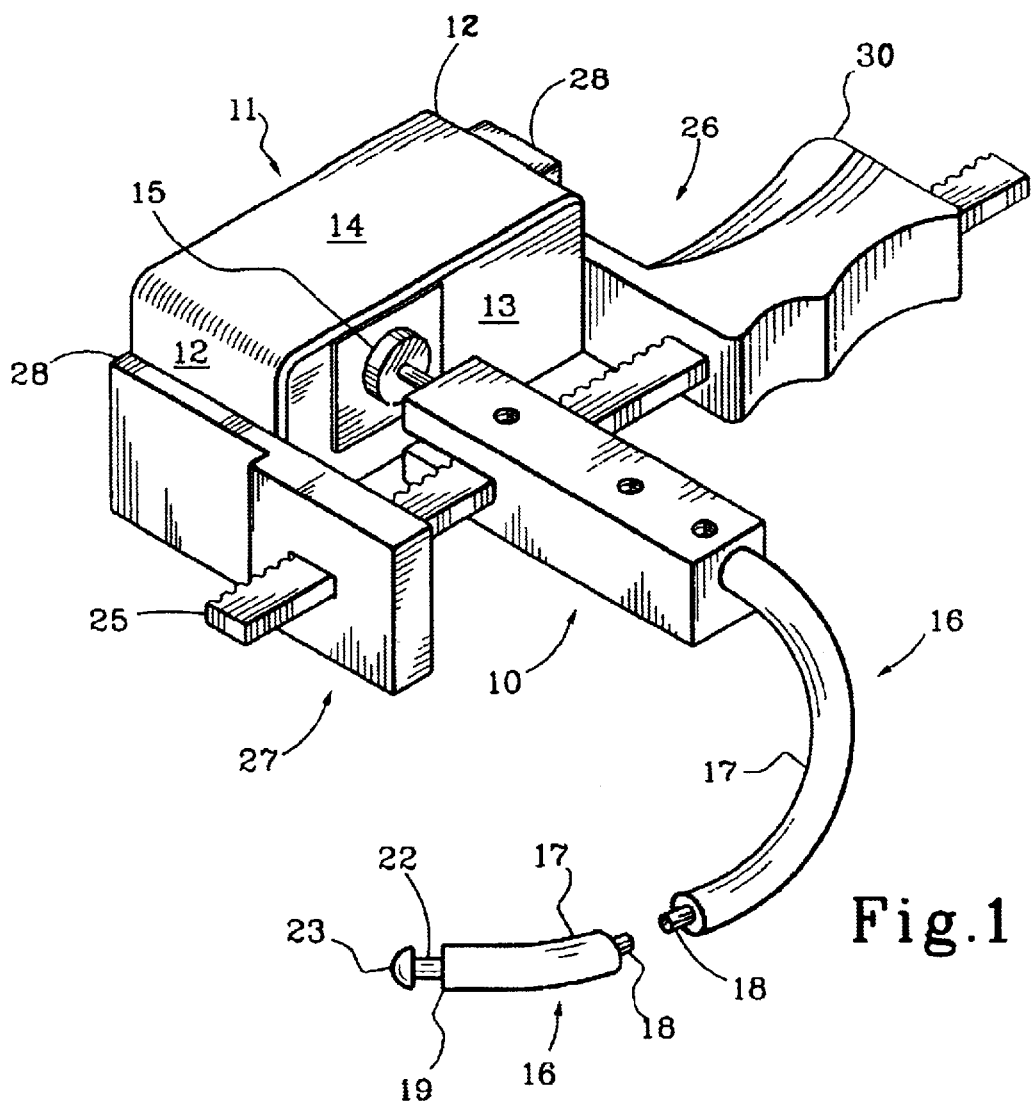
FIG. 1 is a side and rear perspective view of an embodiment of the device of the present invention shown in functional relationship with a push-button control box of the prior art.
Figure 2:
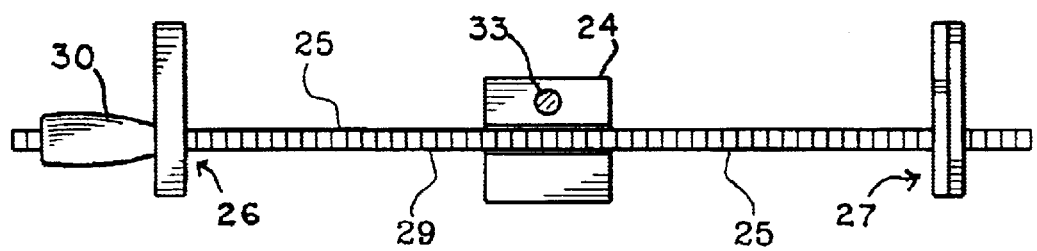
FIG. 2 is a front view of the embodiment of FIG. 1.
Figure 3:
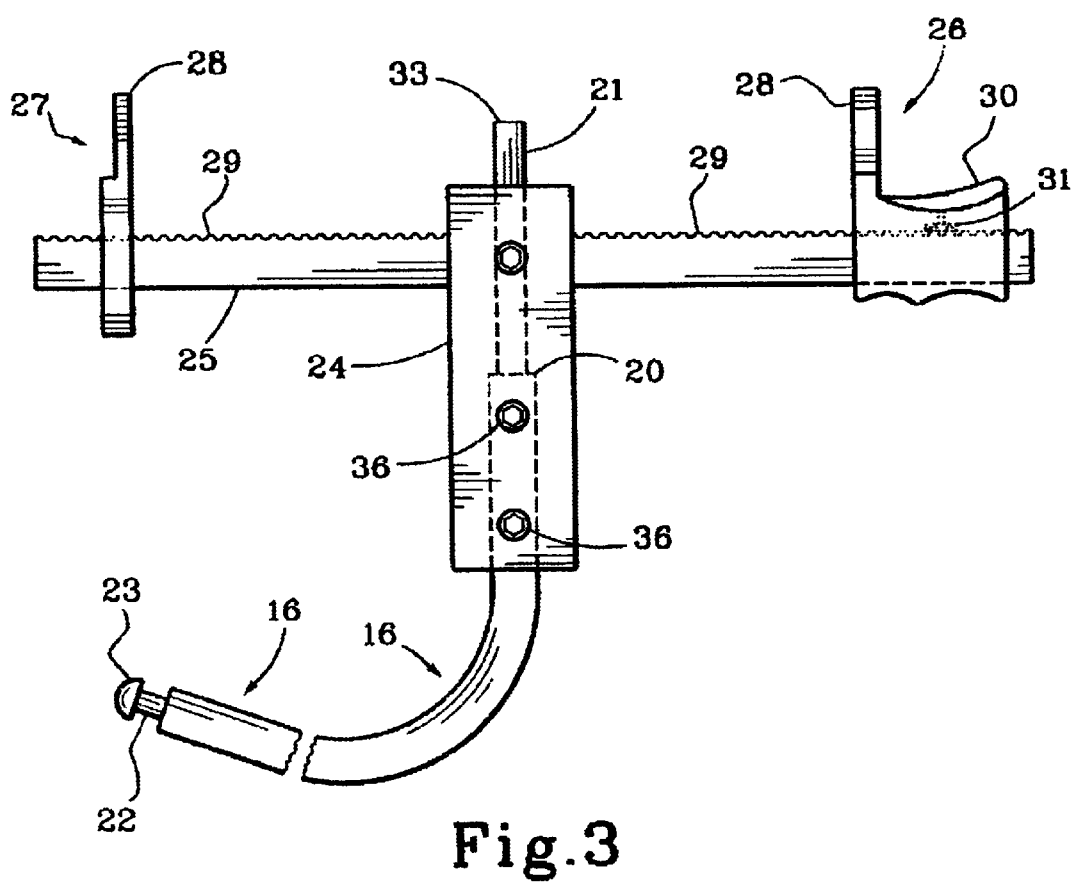
FIG. 3 is a top view of the embodiment of FIG. 1.

Referring now to FIGS. 1–3, an embodiment of the device 10 of the present invention is shown in operative association with a control box 11 of heavy duty construction, having side panels 12, floor panel 13, and roof panel 14. A pushbutton actuation button 15 is protectively mounted within said control box.

The actuation device 10 includes a flexible motion transmitting remote cable assembly 16 comprised of a protective sheath-like conduit 17 which slidably houses an internal moving core element in the form of a force-transmitting cable 18 of multifilament wire in a twisted or braided construction. Such cable assemblies are commercially available from the Fleet Pride Company of Roanoke, Va. Conduit 17 is elongated between a user operated extremity 19 and distal extremity 20. The length of the conduit may range between about 20 and 30 feet. Core element 18 is adapted to undergo reciprocal axial movement within sheath conduit 17. A portion 21 of said core element extends beyond the distal extremity 20 of the conduit, and represents the responsive or action terminus of said core element. At its opposite extremity, a portion 22 of said core element extends beyond the user extremity 19 of the sheath, and terminates in manipulating means in the form of button 23.

Distal extremity 20 is attached to receiving head 24 by way of insertion into internal channel 35 and securement with Alan bolts 36. Terminus 21 ends in a tip 33 adapted to contact the push button 15.

Receiving head 24 is adjustably secured to an elongated rigid straight bar 25. First and second facing clamping components 26 and 27, respectively, are spaced apart on bar 25 on opposite sides of head 24. Each clamping component is provided with a rubberized gripping layer 28 adapted to securely engage a side panel 12 of control box 11.

In a preferred embodiment, one of said clamping components is constructed so as to be interactive with bar 25 to permit controlled and forceful engagement with box 11. In the exemplified embodiment, such interaction is caused by providing a series of uniform teeth 29 along the forward edge of bar 25. Said teeth interact with a handle mechanism on clamping component 26 which employs a squeeze-activated trigger lever 30 having a ratchet mechanism 31 that engages teeth 29. By sequentially squeezing and releasing lever 30, clamping component 27 is quickly and forcefully caused to engage box 11.

Working in conjunction with clamping component 26, clamping component 27 is preferably constructed so as to adjustably anchor at a site along bar 25 so as to position tip 33 accurately in the illustrated horizontal direction so as to contact button 15. The anchoring of clamping component 27 is achieved by way of selective engagement with teeth 29 on bar 25. The vertical positioning of the device, so as to cause tip 33 to center on button 15 in the illustrative embodiment is achieved by manual alignment of bar 25 prior to tightening of the clamping components by manipulation of lever 30.

By virtue of the aforesaid components and their manner of interaction, the device of this invention can be quickly emplaced so as to enable the user to operate the actuating buttons on the control box. Two or more remote cables may be employed for pushing multiple buttons in a straight line pattern. The bar may also be employed in a vertical orientation, and two or more bars may be employed to push buttons spaced apart in vertical and horizontal directions.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A remote control device for depressing actuating buttons associated with a control box having opposed surfaces, said control device comprising:

a) an elongated motion transmitting flexible control cable assembly comprised of a sheath element elongated between a user operated extremity and responsive distal extremity, and a core element disposed within said sheath element for reciprocal sliding movement therein, and having portions that extend beyond the user and distal extremities of said sheath element, b) a clamping mechanism comprised of an elongated straight rigid bar having two facing clamping components spaced apart by an adjustable distance, c) a receiving head slidably positioned on said bar between said clamping components, said receiving head securing in an axially slidable manner the portion of said core element that extends beyond the distal extremity of said sheath element, and d) a contacting tip associated with said core element extending from said receiving head, and pressable against a selected one of the actuating buttons of said control box.

2. The control device of claim 1 wherein said control cable assembly has a length of between 20 and 30 feet.

3. The control device of claim 2 wherein the user extremity of said core element is provided with means for manipulating said core element.

4. The control device of claim 3 wherein said receiving head has an internal channel that secures the distal extremity of said sheath.

5. The control device of claim 4 wherein each of the clamping components is provided with a rubberized gripping layer adapted to securely engage the opposed surfaces of said control box.

6. The control device of claim 5 wherein at least one of said clamping components is interactive with said bar in a manner to permit controlled and forceful engagement with said control box.

7. The control device of claim 6 wherein said bar has a forward edge having a series of teeth which interact with said clamping component.

8. The control device of claim 7 wherein said clamping component has a handle mechanism including a squeeze-activated trigger lever having a ratchet mechanism that engages said teeth.

* * * * *